(12) United States Patent
Ram

(10) Patent No.: US 9,359,137 B2
(45) Date of Patent: Jun. 7, 2016

(54) TUNNELED GAS STORAGE

(71) Applicant: TECTONA LTD., Zurich (CH)

(72) Inventor: Yossef Ram, Ramat Ha'Sharon (IL)

(73) Assignee: TECTONA LTD., Zurich (CH)

( * ) Notice: Subject to any disclaimer, the term of this patent is extended or adjusted under 35 U.S.C. 154(b) by 0 days.

(21) Appl. No.: 14/415,843

(22) PCT Filed: Jul. 17, 2013

(86) PCT No.: PCT/IL2013/050607
§ 371 (c)(1),
(2) Date: Jan. 20, 2015

(87) PCT Pub. No.: WO2014/013490
PCT Pub. Date: Jan. 23, 2014

(65) Prior Publication Data
US 2015/0225173 A1    Aug. 13, 2015

Related U.S. Application Data

(60) Provisional application No. 61/672,355, filed on Jul. 17, 2012, provisional application No. 61/674,510, filed on Jul. 23, 2012.

(51) Int. Cl.
| | |
|---|---|
| *B65G 5/00* | (2006.01) |
| *E02D 29/00* | (2006.01) |
| *E21D 11/38* | (2006.01) |
| *E21B 33/10* | (2006.01) |
| *E21B 41/00* | (2006.01) |
| *E21D 11/00* | (2006.01) |
| *E21D 11/14* | (2006.01) |
| *E21F 17/16* | (2006.01) |
| *E21D 13/00* | (2006.01) |

(52) U.S. Cl.
CPC *B65G 5/00* (2013.01); *E02D 29/10* (2013.01); *E21B 33/10* (2013.01); *E21B 41/0057* (2013.01); *E21D 11/00* (2013.01); *E21D 11/14* (2013.01); *E21D 11/38* (2013.01); *E21D 13/00* (2013.01); *E21F 17/16* (2013.01)

(58) Field of Classification Search
CPC ..... E21B 33/10; E21B 41/0057; E21D 11/00; E21D 11/14; E21F 17/16; B65G 5/00
See application file for complete search history.

(56) References Cited

U.S. PATENT DOCUMENTS

| | | | | |
|---|---|---|---|---|
| 2,810,263 | A * | 10/1957 | Raymond | B65G 5/00 299/19 |
| 3,848,427 | A * | 11/1974 | Loofbourow | F17C 3/005 137/236.1 |
| 3,950,958 | A * | 4/1976 | Loofbourow | F17C 3/005 137/236.1 |
| 4,586,849 | A * | 5/1986 | Hastings | 405/129.35 |
| 5,133,418 | A | 7/1992 | Gibson et al. | |

(Continued)

OTHER PUBLICATIONS

Textdok_601_EGS.dot "UGS of Natural Gas in Israel" Pre-Feasibility Study. New build & Technology 1-58 (2012).

(Continued)

*Primary Examiner* — Benjamin Fiorello
(74) *Attorney, Agent, or Firm* — Browdy and Neimark, PLLC

(57) ABSTRACT

A system for high-pressure natural gas storage includes at least one underground bored tunnel, suitable for holding natural gas under pressure and a process for storing natural gas under pressure.

9 Claims, 2 Drawing Sheets

(56) References Cited

U.S. PATENT DOCUMENTS

| | | | |
|---|---|---|---|
| 5,133,624 A * | 7/1992 | Cahill | 405/129.4 |
| 5,163,520 A * | 11/1992 | Gibson et al. | 175/19 |
| 5,850,614 A * | 12/1998 | Crichlow | 588/17 |
| 6,238,138 B1 * | 5/2001 | Crichlow | 405/129.35 |
| 6,581,618 B2 * | 6/2003 | Hill | B65G 5/00 137/1 |
| 8,210,774 B1 | 7/2012 | Vidovic et al. | |
| 8,256,991 B2 * | 9/2012 | Dickinson et al. | 405/55 |
| 8,277,145 B2 * | 10/2012 | Dickinson et al. | 405/57 |
| 8,454,268 B2 * | 6/2013 | Wilkinson | 405/54 |
| 2008/0209916 A1 * | 9/2008 | White | F17C 5/02 62/48.1 |
| 2009/0220303 A1 * | 9/2009 | Dickinson et al. | 405/55 |
| 2010/0098492 A1 | 4/2010 | Dickinson, III et al. | |
| 2011/0274492 A1 | 11/2011 | Verma et al. | |

OTHER PUBLICATIONS

Terje Brandshaug et al "Technical review of the lined rock cavern (LRC) concept and Design Methodology: Mechanical Response of Rock Mass" 1-85: ref: ICG01-2062-1-4 (Sep. 2001).

LRC storage, "The LRC Concept, a new approach to commercial gas storage" 1-4 (Date not known or available after reasonable inquiry and search).

Wikipedia Community: "Natural Gas storage 1-11" May 30, 2012.

\* cited by examiner

TUNNELED GAS STORAGE

FIELD OF THE INVENTION

This invention relates to tunneled gas storage systems, and methods of their use.

BACKGROUND OF THE INVENTION

Gas storage is principally used to meet seasonal load variations. Gas is injected into storage during periods of low demand and withdrawn from storage during periods of peak demand. It is also used for a variety of secondary purposes, including:
  Balancing the flow in pipeline systems. This is performed by mainline transmission pipeline companies to maintain operational integrity of the pipelines, by ensuring that the pipeline pressures are kept within design parameters.
  Maintaining contractual balance. Shippers use stored gas to maintain the volume they deliver to the pipeline system and the volume they withdraw. Without access to such storage facilities, any imbalance situation would result in a hefty penalty.
  Leveling production over periods of fluctuating demand. Producers use storage to store any gas that is not immediately marketable, typically over the summer when demand is low and deliver it when in the winter months when the demand is high.
  Market speculation. Producers and marketers use gas storage as a speculative tool, storing gas when they believe that prices will increase in the future and then selling it when it does reach those levels.
  Insuring against any unforeseen accidents and or planed or unplanned system shut down for maintenance. Gas storage can be used as an insurance that may affect either production or delivery of natural gas. These may include natural factors such as hurricanes, or malfunction of production or distribution systems.
  Meeting regulatory obligations. Gas storage ensures to some extent the reliability of gas supply to the consumer at the lowest cost, as required by the regulatory body. This is why the regulatory body monitors storage inventory levels.
  Reducing price volatility. Gas storage ensures commodity liquidity at the market centers. This helps contain natural gas price volatility and uncertainty.
  Offsetting changes in natural gas demands. Gas storage facilities are gaining more importance due changes in natural gas demands. First, traditional supplies that once met the winter peak demand are now unable to keep pace. Second, there is a growing summer peak demand on natural gas, due to electric generation via gas fired power plants.

DETAILED DESCRIPTION OF EMBODIMENTS

Measures and Definitions

Figure 1:
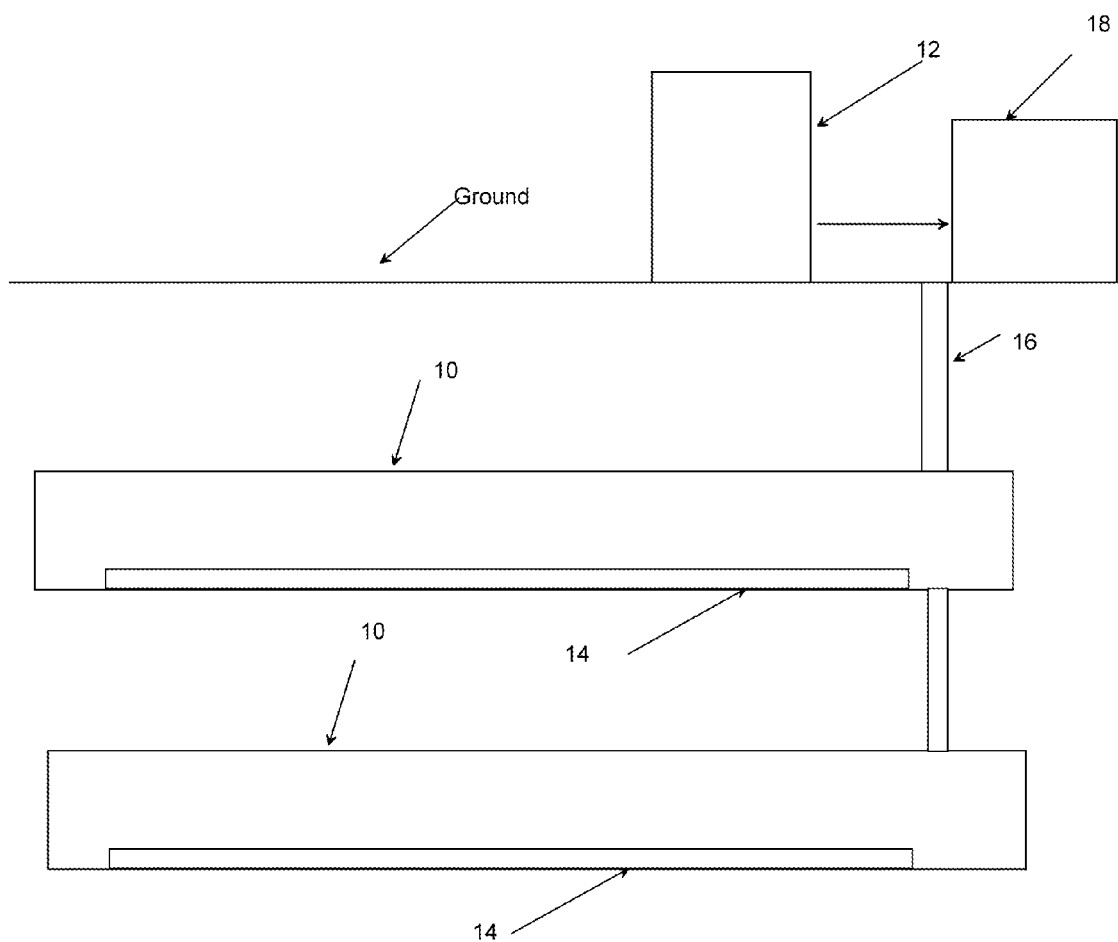
FIG. 1 illustrates a schematic view of a system according to one embodiment of the invention.
Figure 2:
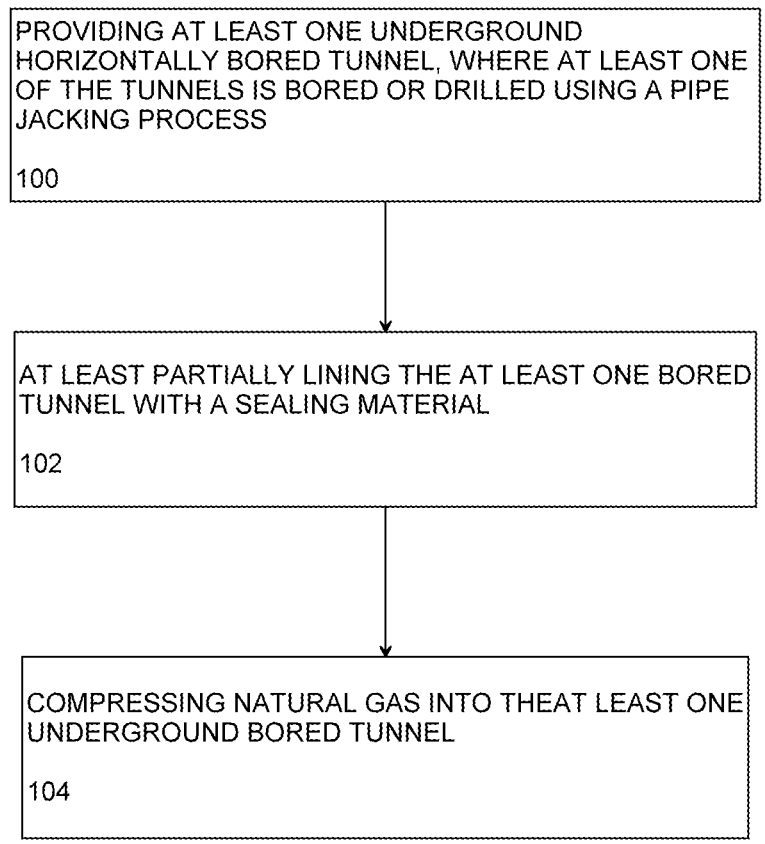
FIG. 2 illustrates a method according to one embodiment of the invention.

Total gas storage capacity: It is the maximum volume of natural gas that can be stored at the storage facility. It is determined by several physical factors such as the reservoir volume, and also on the operating procedures and engineering methods used.
Total gas in storage: It is the total volume of gas in storage at the facility at a particular time.
Base gas (also referred to as cushion gas): It is the volume of gas that is intended as permanent inventory in a storage reservoir to maintain adequate pressure and deliverability rates throughout the withdrawal season.
Working gas capacity: It is the total gas storage capacity minus the base gas.
Working gas: It is the total gas in storage minus the base gas. Working gas is the volume of gas available to the market place at a particular time.
Physically unrecoverable gas: The amount of gas that becomes permanently embedded in the formation of the storage facility and that can never be extracted.
Cycling rate: It is the average number of times a reservoir's working gas volume can be turned over during a specific period of time. Typically the period of time used is one year.
Deliverability: It is a measure of the amount of gas that can be delivered (withdrawn) from a storage facility on a daily basis. It is also referred to as the deliverability rate, withdrawal rate, or withdrawal capacity and is usually expressed in terms of millions of cubic feet of gas per day (MMcf/day) that can be delivered.
Injection capacity (or rate): It is the amount of gas that can be injected into a storage facility on a daily basis. It can be thought of as the complement of the deliverability. Injection rate is also typically measured in millions of cubic feet of gas that can be delivered per day (MMcf/day).

Deliverability depends on several factors including the amount of gas in the reservoir and the pressure etc. Generally, a storage facility's deliverability rate varies directly with the total amount of gas in the reservoir. It is at its highest when the reservoir is full and declines as gas is withdrawn. The injection capacity of a storage facility is also variable and depends on factors similar to those that affect deliverability. The injection rate varies inversely with the total amount of gas in storage. It is at its highest when the reservoir is nearly empty and declines as more gas is injected. The storage facility operator may also change operational parameters. This would allow, for example, the storage capacity maximum to be increased, the withdrawal of base gas during very high demand or reclassifying base gas to working gas if technological advances or engineering procedures allow.

The most important type of gas storage is in underground reservoirs (also referred to as underground gas storage (UGS).

There are different types of UGS. They basically fall into three main groups. Each of these types possesses distinct physical and economic characteristics which govern the suitability of a particular type of storage type for a given application.
  UGS in porous and/or fractured rocks
  Aquifers
  Depleted Gas fields
  Depleted oil fields
  UGS in caverns
  Salt caverns
  Rock caverns
  UGS in abandoned mines
  Coal
  Salt
  Ore Porous rock storages are commonly dimensioned for seasonal balance. Therefore they are designed to be filled during 200 days (summer) and produced during 100 days (winter).

Working gas volumes of porous rock storages range from 100 to $2.000 \times 10^6$ m$^3$ and even more. Deliverability ranges from 20.000 to 60.000 m$^3$/h per well in average. Injection rates range from 10.000 to 30.000 m$^3$/h per well.

Salt cavern storages are normally used as peak shaving storages because of their in comparison to porous rock UGS relatively low WGV and their relatively high deliverability.

Typical working gas volumes for one gas cavern are between 30 and 60 Mio m$^3$. The deliverability range of a gas cavern is from 50.000 to 200.000 m$^3$/h. Injection rates are approximately 100.000 m$^3$/h.

Depleted Gas Reservoir

These are the most prominent and common form of underground storage. They are the reservoir formations of natural gas fields that have produced all their economically recoverable gas. The depleted reservoir formation is readily capable of holding injected natural gas. Using such a facility is economically attractive because it allows the re-use, with suitable modification, of the extraction and distribution infrastructure remaining from the productive life of the gas field which reduces the start-up costs. Depleted reservoirs are also attractive because their geological and physical characteristics have already been studied by geologists and petroleum engineers and are usually well known. Consequently, depleted reservoirs are generally the cheapest and easiest to develop, operate, and maintain of the three types of underground storage.

In order to maintain working pressures in depleted reservoirs, about 50 percent of the natural gas in the formation must be kept as cushion gas. However, since depleted reservoirs were previously filled with natural gas and hydrocarbons, they do not require the injection of gas that will become physically unrecoverable as this is already present in the formation. This provides a further economic boost for this type of facility, particularly when the cost of gas is high. Typically, these facilities are operated on a single annual cycle; gas is injected during the off-peak summer months and withdrawn during the winter months of peak demand.

A number of factors determine whether or not a depleted gas field will make an economically viable storage facility. Geographically, depleted reservoirs should be relatively close to gas markets and to transportation infrastructure (pipelines and distribution systems) which will connect them to that market. Since the fields were at one time productive and connected to infrastructure distance from market is the dominant geographical factor. Geologically, it is preferred that depleted reservoir formations have high porosity and permeability. The porosity of the formation is one of the factors that determines the amount of natural gas the reservoir is able to hold. Permeability is a measure of the rate at which natural gas flows through the formation and ultimately determines the rate of injection and withdrawal of gas from storage.

Porous Rock Storage

Gas will be stored in the pores, inter-granular or fractures of a rock, which must have a connected pore space system with a good permeability. There are some geological preconditions for an UGS in porous and/or fractured rocks, both for depleted gas- or oilfields as well as for aquifers. Closed trap of sufficient size, Lithology sandstone or fractured limestone or dolomite, Areal extend minimum 1 km2, Closure height minimum 20 m, Net pay thickness minimum 10 m, Porosity range between 15-25%, Permeability minimum 200 mD, Depth range 1000-1500 m, at least 600 m, Gastight caprock, mostly claystone minimum 20 m.

There are several types of geological traps of which the anticline structure i.e. four dip closure are the most favorable: Anticline structures, Monocline structure (a half anticline with a fault as boundary), Stratigraphic trap (storage horizon is truncated by sealing claystone), Facies trap (storage horizon is changing laterally into tight claystone).

Porous and permeable sandstones are generally the most common types of storage horizons due to the better petrophysical properties. Fractured horizons instead of porous rocks, like rather tight and dense limestones, dolomites or even cemented sandstones are less used because of the extreme heterogeneity of their fluid paths.

Depleted Gas Fields

If available, depleted gas fields are generally the most favourable choice for UGS purposes compared to all other types of porous/fractured rocks. The most important advantages of depleted gas fields are:

The closed trap of the reservoir and the sealing cap rock are already confirmed by the existence of the gas field over geological time periods (several million years); therefore exploration is very limited or even not necessary.

Based on the production history there is a good knowledge about flow properties and rates, pressure behaviour and water drive from the adjacent aquifer.

The remaining (not produced) gas will be used as cushion gas.

Compared to depleted oil fields with three different phases (residual oil/residual water and storage gas) only two phases (gas/water) are in the pore space of depleted gas fields resulting in much better effective gas permeability.

Gas fields are converted into UGS when the reservoir is approximately half depleted. In average 50% of total gas of this type will represent cushion gas. If the gas field will be converted into an UGS before the adjacent aquifer has invaded the de-pressured reservoir totally the first gas fill is easier, faster, safer and with less cost compared to aquifers where the original formation water has to be replaced by the injected gas. Therefore it is common and recommendable to convert gas fields into an UGS when the reservoir is approximately half depleted.

In many cases some of the existing wells are suited as wells for storage or as observation wells.

When converting depleted fields into UGS there is always a potential technical risk. There could be some old exploration or production wells with insufficient cementation of the casing. Before starting gas injection these wells have to be repaired in order to avoid any gas migration behind the casing.

Depleted Oil Fields

It has to be differentiated between gas-saturated and under-saturated oil fields. Whereas the gas-saturated oil fields have a so-called gas cap in the top part of the reservoir overlying the oil, the gas-undersaturated oil fields originally only contain oil. With production the pressure in the reservoir decreases. When the reservoir pressure drops below the so-called bubble point, the originally gas-free oil becomes saturated. It then starts to release gas. Depending on the PVT characteristics of the specific oil, its original gas/oil ratio, the individual geometric form of the reservoir and its petrophysical parameters, even the rate of producing the field, a so-called secondary gas cap might form. Given time, the gas released from the oil will migrate upwards and displace the oil from the reservoir top.

But compared to the primary gas cap of a saturated oil field, where the separation process has taken hundreds of millions of years, the gradual forming of a secondary gas cap takes place during a part of the production time only. Consequently there is much more oil left in a secondary gas cap compared to a primary gas cap. Depleted oilfields without at least a secondary gas cap are not really a first choice to be converted into UGS because they afford a complex effort.

Regarding surface facilities to clean the stored gas when re-produced. In addition, the pore space of a depleted oilfield after primary production is still filled with 60-70% of the original oil. This remaining oil not only reduces the usable porosity and therefore the space for the storage gas volume but also additionally decreases the effective permeability for the gas.

Aquifers

Aquifers are underground, porous and permeable rock formations that act as natural water reservoirs. In some cases they can be used for natural gas storage. Usually these facilities are operated on a single annual cycle as with depleted reservoirs. The geological and physical characteristics of aquifer formation are not known ahead of time and a significant investment has to go into investigating these and evaluating the aquifer's suitability for natural gas storage.

If the aquifer is suitable, all of the associated infrastructure must be developed from scratch, increasing the development costs compared to depleted reservoirs. This includes installation of wells, extraction equipment, pipelines, dehydration facilities, and possibly compression equipment. Since the aquifer initially contains water there is little or no naturally occurring gas in the formation and of the gas injected some will be physically unrecoverable. As a result, aquifer storage typically requires significantly more cushion gas than depleted reservoirs; up to 80% of the total gas volume. Most aquifer storage facilities were developed when the price of natural gas was low, meaning this cushion gas was inexpensive to sacrifice. With rising gas prices aquifer storage becomes more expensive to develop.

A consequence of the above factors is that developing an aquifer storage facility is usually time consuming and expensive. Aquifers are generally the least desirable and most expensive type of natural gas storage facility.

In comparison to hydrocarbon fields aquifer structures have the important disadvantage regarding a lack of knowledge of the exact size, shape and condition of the structure. While for the depleted oil and gas fields a closed trap has been confirmed over geological times, the trap integrity, the suitability of the potential storage rock and the sealing capacity of the cap rock have to be explored very carefully for aquifer structures. Exploration work is very cost and time consuming Cavern Storage Salt Caverns Underground salt formations are well suited to natural gas storage. Salt caverns allow very little of the injected natural gas to escape from storage unless specifically extracted. The walls of a salt cavern are strong and impervious to gas over the lifespan of the storage facility.

Once a suitable salt feature discovered and found to be suitable for the development of a gas storage facility a cavern is created within the salt feature. This is done by the process of cavern leaching. Fresh water is pumped down a borehole into the salt. Some of the salt is dissolved leaving a void and the water, now saline, is pumped back to the surface. The process continues until the cavern is the desired size. Once created, a salt cavern offers an underground natural gas storage vessel with very high deliverability. Cushion gas requirements are low, typically about 33 percent of total gas capacity.

Salt caverns are usually much smaller than depleted gas reservoir and aquifer storage facilities. A salt cavern facility may occupy only one one-hundredth of the area taken up by a depleted gas reservoir facility. Consequently, salt caverns cannot hold the large volumes of gas necessary to meet base load storage requirements. Deliverability from salt caverns is, however, much higher than for either aquifers or depleted reservoirs. This allows the gas stored in a salt cavern to be withdrawn and replenished more readily and quickly. This quick cycle-time is useful in emergency situations or during short periods of unexpected demand surges.

Although construction is more costly than depleted field conversions when measured on the basis of dollars per thousand cubic feet of working gas, the ability to perform several withdrawal and injection cycles each year reduces the effective cost.

Salt cavern storages are constructed by solution mining techniques, creating a cylindrical underground cavity. Common dimensions are h~120 m and d~60 m resulting in a geometrical volume of V~300 000 m$^3$. Assuming an operating pressure range between pmax and pmin of 100 bar results in a WGV~30*10$^6$ m$^3$ under standard conditions.

Rock salt is originally deposited as a horizontal layer. However, due to the rheological properties of rock salt i.e. semi-plastic behaviour instead of elastic behaviour as with hard rocks, rock salt can rise upwards, piercing the horizons above, (especially below coverage of thick sediments) and forming salt pillows, salt domes and even elongated salt walls. During the rising (halocinetic process) the salt layer will be intensively folded together with the non-saliferous intercalations to a very complex salt body.

There are some geological and technical pre-conditions for a rock salt body to be used for the construction of an UGS:

Salt body in a depth range 600-1900 m and of sufficient size.

Salt body with sufficient thickness generally greater than 200 m.

No tectonic faults crossing the presumed salt caverns location within the salt body.

Salt body of sufficient purity. The amount of non-saliniferous minerals less than 25-30% in average, not thicker i.e. roughly greater than 6 m intercalations of highly soluble potassium salts or non-soluble anhydrites, gypsum, kieserite or claystone.

Availability of fresh water for leaching. Approximately 8 m$^3$ of fresh water are needed to leach 1 m$^3$ of salt.

Possibility of brine disposal.

Whereas porous rock UGS in average have working gas capacities of several hundred millions and in cases of billions of cubic meters, UGS in individual salt caverns only have average working gas capacities in the range of tens of millions of cubic meters. On the other side gas cavern wells have much higher injection and withdrawal capacities than wells of UGS in porous rocks. Therefore gas caverns are commonly used for peak shaving.

Due to the limited working gas volume per individual cavern and the time and cost intensive leaching operation, on average 1.5 to 2 years, the volume-specific investment costs for cavern storage is generally higher than for porous rock storage. However, this relation is reversed for capacity i.e. deliverability oriented specific costs.

It is noted that rock caverns and abandoned mines may also be used as UGS, however they usually provide storage for relatively small working gas volumes.

Lined Rock Cavern (LRC)

The storage of pressurized natural gas in large steel-lined caverns excavated in crystalline rock. The LRC gas-storage rely on a rock mass (primarily, crystalline rock) to serve as a pressure vessel in containing stored natural gas at maximum pressures from about 15 MPa to 25 MPa. The concept involves the excavation of relatively large, vertically cylindrical caverns 20 m to 50 m in diameter, 50 m to 115 m tall, with domed roofs and rounded inverts to maximize excavation stability.

The caverns are located at depths from 100 m to 200 m below the ground surface, and they are lined with approximately 1-m thick reinforced concrete and thin (12-mm to 15-mm) carbon steel liners. The purpose of the steel liner, which is the inner liner, is strictly to act as an impermeable barrier to the natural gas. The purpose of the concrete is to provide a uniform transfer of the gas pressure to the rock mass and to distribute any local strain in the rock mass (e.g., from the opening of natural rock fractures) at the concrete/rock interface more evenly across the concrete to the steel liner/concrete interface. To further minimize local circumferential strains in the steel liner, a viscous layer (~5 mm thick) made of a bituminous material is placed between the steel and the concrete liners.

Liquefied Natural Gas (LNG) Storage

LNG facilities provide delivery capacity during peak periods when market demand exceeds pipeline deliverability. LNG storage tanks possess a number of advantages over underground storage. As a liquid at approximately −163° C. (−260° F.), it occupies about 600 times less space than gas stored underground, and it provides high deliverability at very short notice because LNG storage facilities are generally located close to market and can be trucked to some customers avoiding pipeline tolls. There is no requirement for cushion gas and it allows access to a global supply. LNG facilities are, however, more expensive to build and maintain than developing new underground storage facilities.

Pipeline Capacity

Gas can be temporarily stored in the pipeline system itself, through a process called line packing. This is done by packing more gas into the pipeline via an increase in the pressure. During periods of high demand, greater quantities of gas can be withdrawn from the pipeline in the market area, than is injected at the production area. The process of line packing is usually performed during off peak times to meet the next-day's peaking demands. This method, however, only provides a temporary short-term substitute for traditional underground storage.

UGS Surface Facilities:

The gas for injection enters the station from the transport line and before being injected into the storage well(s) passes through the
  metering station
  compressor station
  cooler
  oil separator
  manifold The produced gas comes from the storage well(s) and before it enters into the transport line it passes through the following units:
  manifold
  liquid separator
  heater
  pressure reduction
  dehydrator
  metering system Depending on the depth of the UGS and its resulting pressure range and the pressure in the transport line, injection or part of it and/or production or part of it can be accomplished without using the compressor.

The System of the Invention

In one of the aspects of the invention there is provided a system for high-pressure natural gas storage, illustrated in FIG. 1, comprising at least one underground bored tunnel 10 (i.e. the tunnel is horizontal and manmade by technical machinery capable of boring a tunnel/pipe into the earth at a specific preferred location), suitable for holding said natural gas under pressure.

In some embodiments of a system of the invention, illustrated in FIG. 1, said at least one bored tunnel 10 (horizontally) is bored at a depth suitable for holding said natural gas under predetermined pressure. It is noted that the depth of said at least bored tunnel holding pressurized natural gas is selected so that said pressurized gas is maintained is said pressurized state. Furthermore, the depth of said tunnel is also determined by the strength of the soil it is bored in. For example, rock-mass mechanical parameters (i.e., stiffness and strength) are used to estimate tunnel location (i.e., depth), maximum gas pressure. Thus, for softer types of soils or rock masses, said at least one tunnel should be bored in a much deeper depths than soil or rock masses that have higher strength. In some embodiments of a system of the invention said depth is at least about 3 m. In some other embodiments of a system of the invention said depth is at least about 50 m. In further embodiments of a system of the invention said depth is between about 50 m to about 10,000 m.

In some embodiments, a system of the invention comprises at least two underground bored tunnels 10. Furthermore, said system may include additional tunnelled pipes for other purposes such as for example: pipes or tunnels bored for ventilation purposes, for maintenance purposes, for emptying purposes and so forth.

In further embodiments of a system of the invention, said at least two underground bored tunnels 10 are interconnected (see FIG. 1).

In some embodiments of the present invention said at least one or at least two bored tunnels are at least partially lined (i.e. not all the internal surface of the tunnel is lined) with sealing material 14. In other embodiments substantially the entire internal surface of the tunnel is lined.

In some embodiments of the present invention, said at least one tunnel is bored in any method know in the art, using any machinery suitable for tunneling in a soil or rock mass in the desired location.

In some embodiments said boring method is pipe jacking or pipe ramming (using hydraulic jacks to push specially made pipes, preferably steal-lined concrete pipes, through the ground behind a tunnel boring machine or shield), box jacking. In some embodiments said bored tunnels also comprise at least one shaft 16.

In some embodiments, when utilizing a pipe jacking process the pipeline with the heading machine creating the pipe or tunnel at its tip is driven by hydraulic cylinders from the launch shaft towards the target shaft.

In some further embodiments segment lining (ring-shaped steel-reinforced lining segments) are added either during drilling or boring or immediately. In further embodiments, the drilled/bored ground or rock are supported using rock securing devices. In some embodiments any know horizontal directional drilling technique and machines are used for tunneling said tunnels.

In embodiments when tunneling is achieved through pipe jacking, said tunnel depth can be between about 3 to 200 m.

It is noted that said at lining of the tunnel is performed in any method know in the art (such as for example plating, painting, spaying and so forth). In further embodiments, said sealing material is selected from at least one type of polymer, at least one type of paint, at least one type of metal, at least one type of concrete mixture or any combination thereof.

In some embodiments, the cushion gas volume of said system of the invention is less than about 5% of total gas in storage is said system.

In some embodiments a system of the invention further comprising a surface unit 12 capable of delivering said stored gas into the infrastructure of a gas delivery system 18.

In yet further embodiments, a system of the invention, further comprising a surface unit capable of compressing natural gas into said at least one underground bored tunnel.

In a further aspect the invention provides a process for storing natural gas under pressure comprising: providing a system of at least one underground bored tunnel (step 100); at least one horizontally bored tunnel being at least partially lined with sealing material (102); the sealing material being selected from the group consisting of at least one type of polymer, at least one type of paint, at least one type of metal, at least one type of concrete mixture and any combination thereof; and compressing natural gas into said at least one underground bored tunnel (step 104).

The invention claimed is:

1. A system for storage of natural gas under pressure comprising at least one underground mechanically horizontally bored tunnel for holding said natural gas under pressure; wherein said at least one horizontally bored tunnel is at least partially lined with sealing material; wherein said sealing material is selected from at least one type of polymer, at least one type of paint, at least one type of metal, at least one type of concrete mixture or any combination thereof; and further comprising a surface unit capable of delivering said stored gas into an infrastructure of a gas delivery system.

2. A system according to claim 1, comprising at least two horizontally underground bored tunnels.

3. A system according to claim 1, comprising at least two interconnected horizontally underground bored tunnels.

4. A system according claim 1, wherein said bored tunnel is substantially line with said sealing material.

5. A system according to claim 1, wherein said at least one bored tunnel is bored at a depth suitable for holding said natural gas under predetermined pressure.

6. A system according to claim 1, wherein said at least one bored tunnel is bored at a depth of at least about 3 m to about 10,000 m.

7. A system according to claim 1, having cushion gas volume of less than about 5% of total gas in storage.

8. A process for storing natural gas under pressure comprising:
   providing a system of at least one underground mechanically horizontally bored tunnel; and
   at least partially lining said at least one underground mechanically horizontally bored tunnel with a sealing material; wherein said sealing material is selected from the group consisting of at least one type of polymer, at least one type of paint, at least one type of metal, at least one type of concrete mixture and any combination thereof;
   compressing natural gas into said at least one underground bored tunnel using a surface unit capable of delivering said stored gas into an infrastructure of a gas delivery system.

9. A process according to claim 8, further comprising boring or drilling said at least one underground horizontal tunnel using a pipe jacking process.

\* \* \* \* \*